United States Patent [19]

Phillip

[11] Patent Number: 5,027,574

[45] Date of Patent: * Jul. 2, 1991

[54] THERMALLY INSULATING STRUCTURE

[76] Inventor: Bradley L. Phillip, 20976 Fairmont Blvd., Shaker Heights, Ohio 44118

[*] Notice: The portion of the term of this patent subsequent to May 29, 2007 has been disclaimed.

[21] Appl. No.: 528,958

[22] Filed: May 25, 1990

Related U.S. Application Data

[63] Continuation-in-part of Ser. No. 188,820, Jul. 2, 1988.

[51] Int. Cl.$^5$ .............................................. E06B 7/12
[52] U.S. Cl. ..................................... 52/171; 52/788; 52/791
[58] Field of Search ................ 52/788, 790, 171, 172, 52/791; 428/34; 29/462

[56] References Cited

U.S. PATENT DOCUMENTS

| | | |
|---|---|---|
| 49,167 | 8/1865 | Stetson . |
| 2,011,557 | 8/1935 | Anderegg . |
| 2,756,467 | 7/1956 | Etling . |
| 3,940,898 | 3/1976 | Kaufman . |
| 3,971,178 | 7/1976 | Mazzory et al. . |
| 3,990,201 | 11/1976 | Falbel . |
| 4,035,539 | 7/1977 | Luboshez . |
| 4,047,351 | 9/1977 | Derner et al. . |
| 4,531,511 | 7/1985 | Hochberg . |
| 4,683,154 | 7/1987 | Benson et al. . |
| 4,687,687 | 8/1987 | Terneu et al. . |

FOREIGN PATENT DOCUMENTS 0000031 12/1978 European Pat. Off. .

OTHER PUBLICATIONS

Applied Solar Energy, an introduction, Meinel and Meinel, Addison-Wesley Pub. Co., 1976, Ch. 10.
Thermal Performance of Insulating Window Systems, Lawrence Berkeley Lab Report DE-79-5, No. 5, Berkeley, CA.
Machine Design, Jun. 26, 1986, pp. 12-13, Aerogels Show Promise as Window Materials.
Solar Energy Materials 7 (1983), pp. 393-400, North Holland Publishing Company, Transparent Silica Aerogels for Window Insulation.

Primary Examiner—David A. Scherbel
Assistant Examiner—Linda J. Watson
Attorney, Agent, or Firm—Townsend and Townsend

[57] ABSTRACT

A thermally insulating panel structure (2, 60) is created by filing the space (16, 67) between two panels (4, 6, 61, 62) with a gas exhibiting low thermal conductivity at a moderately low pressure so to substantially eliminate convection heat flow through the insulating region but not so low as to substantially reduce conduction heat flow through the insulating region. Doing so greatly increases the thermal insulating qualities of the structure without the problems associated with evacuating the region to extremely low pressures. The seal (14, 50, 66) at the edges (10, 12, 64, 65) of the panels can define one or more barrier regions (44, 46) which reduce air leakage into the insulating region.

36 Claims, 3 Drawing Sheets

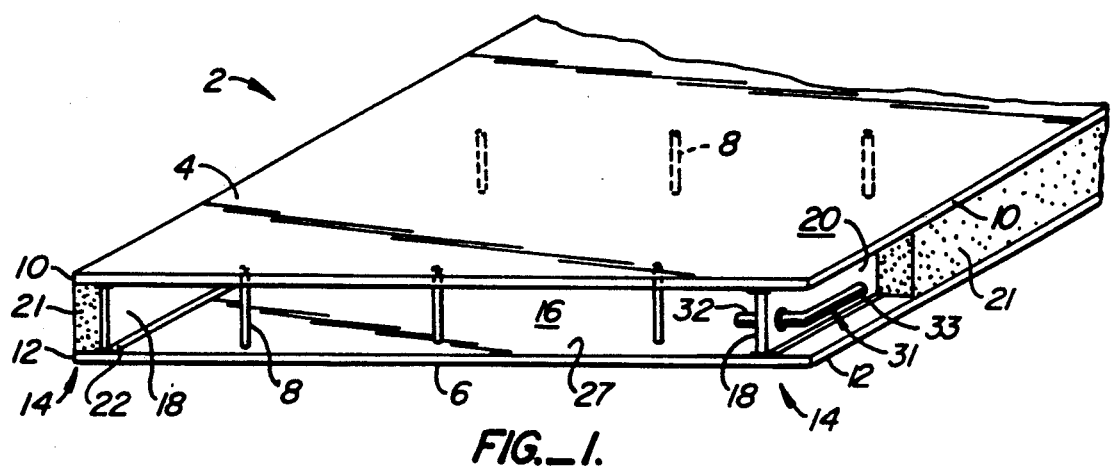
FIG._1.
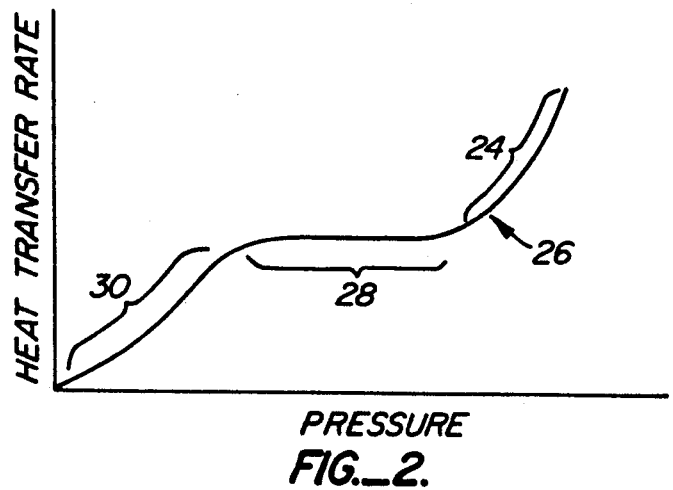
FIG._2.
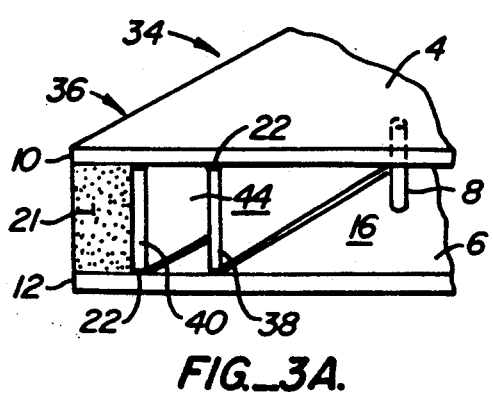
FIG._3A.
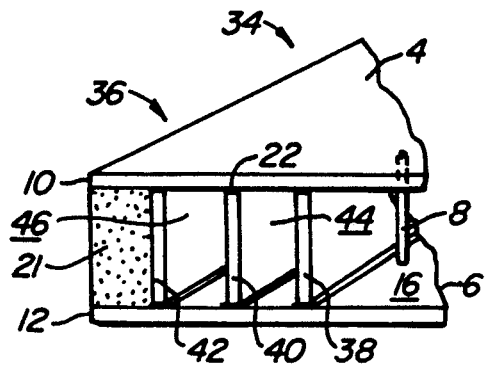
FIG._3B.

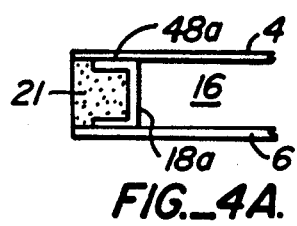
FIG._4A.
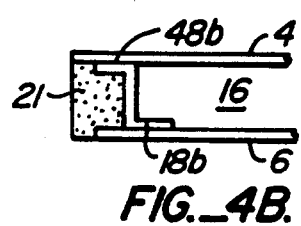
FIG._4B.
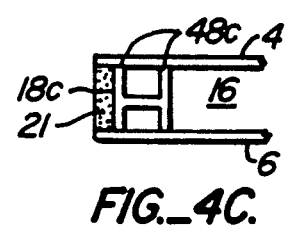
FIG._4C.
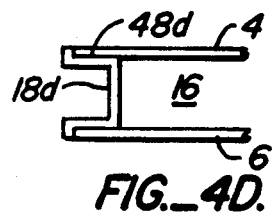
FIG._4D.
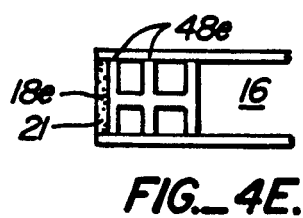
FIG._4E.
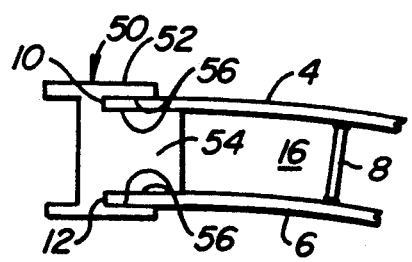
FIG._5.

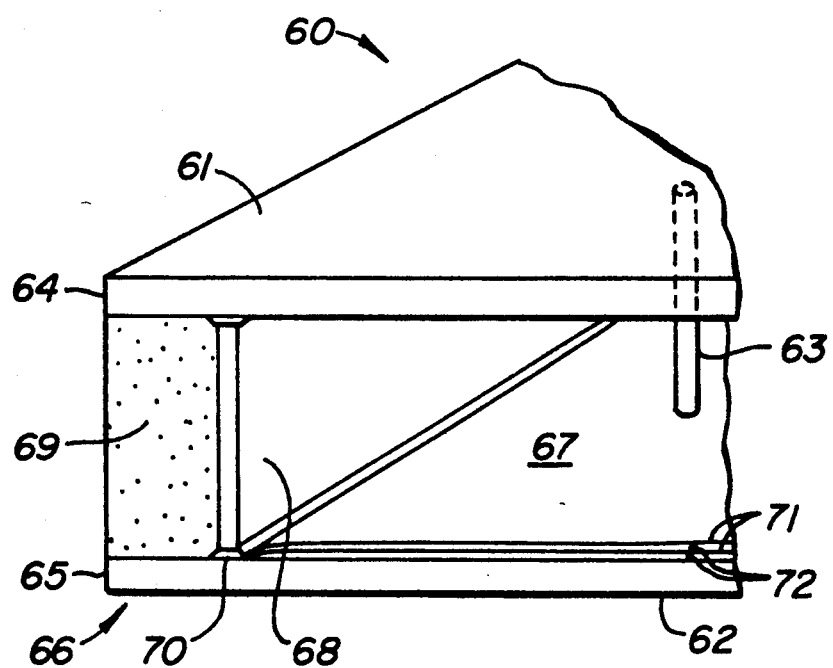
FIG._6.

THERMALLY INSULATING STRUCTURE

This is a continuation-in-part of application Ser. No. 188,820, filed July 2, 1988, now U.S Pat. No. 4,928,448 issued May 29, 1990.

BACKGROUND OF THE INVENTION

This invention is generally related to thermally insulating structures, and more specifically to a high thermal efficiency, sealed dual panel structure containing a gas or vapor at moderately low vacuum.

Undesired thermal losses and gains through windows have been estimated to account for five percent of the total energy consumption in the United States. Most windows in the U.S. are old, energy-inefficient single and double pane units having insulating values of about R-1 and R-2 respectively. (R-value is a standard unit indicating resistance to heat transfer in terms of °F.-ft² hr/BTU.) By contrast, exterior walls designed to current energy efficiency standards yield R-values from R-11 to R-30. Consequently, considerable effort is being devoted worldwide to the development of high performance window glazings.

One such effort involves the continued development of low-emissivity infrared reflective coatings which are applied to an interior surface of a double pane window. These low emissivity windows are currently available in the market and increase the thermal effectiveness of double pane windows from R-2 to about R-3 at a moderate increase in cost. A more advanced window design described in U.S. Pat. No. 4,335,166, issued to R. A. Lizardo and R. D. O'Shaughnessey, incorporates a low emissivity coating on a clear plastic film suspended between two panes of glass. This design is reported to achieve thermal insulating values of R-4 when filled with air, and as high as R-5 when filled with argon. Although an improvement, these low emissivity windows are still thermally inefficient when compared with the walls surrounding the windows.

Another effort to develop high performance window glazings involves the use of very low pressure vacuum in a sealed dual pane unit. U.S. Pat. No. 4,683,154, issued to D. K. Benson and C. E. Tracy, describes a window evacuated to a pressure of about $10^{-6}$ torr (760 torr = 1 atmosphere) and using a low emissivity coating on one or both of the interior surfaces resulting in an estimated thermal insulating value of R-10 to R-12. Since conventional window edge seals are ineffective at preventing the loss of the extreme vacuum, Benson and Tracy propose an all glass welded edge seal fabricated by heating the two panes of glass to above their annealing temperature (about 1000° F.) in a vacuum furnace, allowing the edges to deform slightly, and using a laser beam to weld the edges together.

Although the application of very low pressure vacuum in dual pane windows as described in U.S. Pat. No. 4,683,154 appears promising, significant practical obstacles remain. The requirement that the glass panes be heated to above their annealing point is both costly and effectively precludes the use of laminated safety glass or tempered glass to provide a margin of safety in the event of glass breakage. Further, many low emissivity, reflective and specialty coatings are damaged by high temperatures. Maintenance of the extreme vacuum (about one-billionth of atmospheric pressure) is a formidable obstacle which requires the use of a reactive metal getter to absorb outgassed and transmitted reactive gases. Finally, the highly conductive edge seals transfer enough heat to degrade the overall window performance by as much as 30% unless a bulky insulated edge baffle is used.

SUMMARY OF THE INVENTION

The present invention is directed to a thermally insulating structure useful in a variety of applications in which an enclosure defines an insulating region filled with a gas or vapor having low thermal conductivity. The pressure of the gas is lowered sufficiently so as to substantially eliminate convective heat flow through the gas but not so low as to substantially reduce conductive heat flow through the insulating region.

It has been found that as the pressure of a gas confined between two parallel surfaces is reduced, the heat loss due to convection decreases until a moderately low pressure (typically on the order of 100–200 torr for most gases confined in a one-inch wide double pane window) is reached. If energy loss between the surfaces is plotted versus pressure, a flattened or plateau region is found in this moderately low pressure range. In this region, called the conduction range, convective heat losses are substantially eliminated while the conductive heat losses remain. Only by greatly reducing the pressure will the heat loss be reduced further. This region, called the Piriani range, typically begins at pressures on the order of $10^{-3}$ to $10^{-4}$ torr. The evacuated window disclosed in U.S. Pat. No. 4,683,154 relies on a Piriani range pressure of about $10^{-6}$ torr to achieve greatly reduced gas conduction heat losses.

One of the primary aspects of the invention is the recognition that many of the problems associated with extreme vacuum insulated windows and other panel-like structures can be eliminated if one were to operate at a pressure which is low enough to substantially eliminate convective heat losses (not much higher than about 100–200 torr for most gases and vapors, but not less than about $10^{-3}$ torr) coupled with choosing a gas having low thermal conductivity in the moderately low vacuum range to minimize conduction losses. That is, the present invention contemplates pressures which are as much as about $10^{-8}$ times less severe than those encountered with prior art extreme vacuum insulated windows; sealing problems, gas transmission and outgassing problems are all reduced with the invention. By eliminating the convective heat loss, the remaining sources of heat transfer are attributable to the thermal conductivity of the gas, radiation between the surfaces of the enclosure, and heat conduction through edge seals and any center supports.

The use of a gas or vapor having a low thermal conductivity could result in a moderate vacuum window with a much higher thermal insulating factor than conventional windows. For example, the use of trichlorofluoromethane could provide a thermal insulation rating of R-22 for a one-inch vapor space if there were no losses due to radiation or edge effects. In contrast, air under like conditions (at a pressure low enough to substantially eliminate convective heat transfer but not so low as to substantially reduce conductive heat transfer) would exhibit a thermal insulation rating of about R-6, again assuming no losses due to radiation or edge effects. In addition to trichlorofluoromethane, numerous other gases and vapors having substantially lower thermal conductivities than air are applicable to the scope of this invention. Such gases and vapors include, but are not limited to, argon, bromine, carbon disulfide, dichlorodifluoromethane, krypton, and sulfur hexafluoride.

As used in this application, a gas is considered to have a substantially lower thermal conductivity than that of air if it exhibits a thermal conductivity which is about 25% less than that of air at conduction range pressures. The improvement by this lowering of the conductivity is expected to provide a meaningful improvement in thermal insulation over that of air. Preferably, and for an even greater improvement in thermal insulation, the low conductivity gas used will exhibit a thermal conductivity of at least about 50% less than that of air at conduction range pressures.

The radiation losses can be minimized by appropriate design and the use of low emissivity coatings on the surfaces. Use of low conductivity spacers and edge seals, when necessary, can also help the thermal insulating qualities. As an example, it is expected that an insulating factor of R-15 for a dual pane glass window having a moderate vacuum trichlorofluoromethane filled one-inch vapor space between the panes can be achieved with the present invention using current technology.

One of the advantages of the invention is that plastic safety films can be used on inside window surfaces (so as to be protected against scratching) as well as outside surfaces. Windows made with welded glass edges, because of the temperatures involved, would not be able to use such films on their internal surfaces.

Another aspect of this invention is directed to nonoptically transparent insulating enclosures suitable for refrigerators, freezers, water heaters, ovens, walls, roofs, liquified gas storage tanks, etc. In these applications, the panels need not be constructed of glass, which is relatively fragile, but can be made of stronger materials such as metals, metal/plastic laminates, plastics, ceramics, etc. In these applications where optical transparency is unnecessary, multiple radiation shields can be used to dramatically reduce radiation heat losses as compared to limits encountered in windows.

A further aspect of this invention concerns the use of a low vapor pressure, low permeability adhesive as the vacuum sealant bonding the glass panes and other panels to the edge spacer bars. For all practical purposes, the panes of the glass and the non-glass panels can be considered to be completely impermeable to the gases of the surrounding atmosphere, and the edge spacer bars can be constructed of any number of materials which also have negligible gas permeability. However, even the highest quality adhesive sealants available have some gas permeability when placed in vacuum service. This property makes adhesive sealants completely unsuitable for the prior art extreme vacuum ($10^{-6}$ torr) panel structures, but readily permits their use in this invention in which the vacuum space is many orders of magnitude higher in pressure. As described more fully below, the amount of atmospheric leakage into a sealed moderate vacuum panel structure can be minimized to such an extent that the thermal insulating performance degradation over time periods of 20-30 years or more will be negligible. The use of acceptably low leakage adhesive sealants is a significant advance in the vacuum window art; such sealants can be used at near room temperature conditions, thereby allowing the use of many heat sensitive products such as laminated safety glass, tempered glass, specialty and low emissivity coatings, etc.

The edge seals can be made to include one or more buffer regions, which can be filled with low thermal conductivity gas. If the buffer region is at substantially atmospheric pressure, some of this gas will leak into the bulk interior insulating region, resulting in greatly reduced contamination of higher thermal conductivity atmospheric gases compared to an unbuffered seal design. Alternatively, the buffer region may be at subatmospheric pressure, which also serves to reduce contamination of the bulk interior insulating region with atmospheric gas. A particularly effective dual buffer seal design would contain low conductivity gas at atmospheric pressure in the outer region, with low pressure gas contained in the inner region. Buffer regions may also contain air under vacuum, which also results in reduced contamination of the main insulating region with atmospheric gases compared to an unbuffered design.

Other features and advantages of the invention will appear from the following description in which the preferred embodiment has been set forth in detail in conjunction with the accompanying drawings.

BRIEF DESCRIPTION OF THE DRAWINGS

FIG. 1 is an end oblique view of a window made according to the invention.

FIG. 2 is a graph of heat transfer versus pressure for a gas.

FIGS. 3A and 3B are partial end oblique views of alternative embodiments of the window of FIG. 1.

FIG. 4A-4E illustrate five different cross-sectional shapes for edge seals.

FIG. 5 shows a further configuration for edge seals.

FIG. 6 is a partial end oblique view of a metal panel as an alternate embodiment of the window of FIG. 1.

DETAILED DESCRIPTION OF THE PREFERRED EMBODIMENTS

Referring now to FIG. 1, an insulating window 2 is shown to include first and second panes of glass 4, 6 separated by spacers 8 and sealed along their edges 10, 12 by edge seals 14. Glass planes 4, 6 will preferably have at least one low emissivity coating on at least one of their surfaces. Edge seals 14 and first and second panes 4, 6 define a main insulating region 16 therein. Edge seals 14 in the preferred embodiment are made from edge spacers 18 of a low thermal conductivity material to help reduce conduction losses between first and second panes of glass 4, 6 along the edge seals, although edge spacers 18 could alternatively be made of more common, higher conductivity materials such as metal or glass. Likewise, spacers 8 are also preferably made from a low thermal conductivity material and it can also be configured with narrowed portions to restrict thermal conductivity.

When edge spacers 18 are made of a gas permeable material, such as many plastics, edge spacers 18 are covered on at least one of their surfaces 20 with a low permeability film, such as aluminum, to help prevent migration of gases. The regions between panes 4, 6 and external of surfaces 20 are filled with a protective material 21, such as silicone, polysulfide or polyisobutylene. Such materials provide a protective, water-resistant coating for the adjacent vacuum seals, and also contribute mechanical strength in maintaining the proper positioning of glass panes 4, 6. Adhesion between edge spacers 18 and panes of glass 4, 6 is by layers of sealant 22. Sealant 22 is preferably a low vapor pressure, low gas permeability adhesive, such as Torr Seal brand epoxy sealant of Varian Associates, Inc., Vacuum Products Division, of Palo Alto, Calif. Since glass panes 4, 6 exhibit low (substantially no) gas permeability, window 2 defines an enclosure having low gas permeability.

Insulating region 16 is filled with a gas at a pressure at which convective heat losses are substantially eliminated. As shown in FIG. 2, in which the heat transfer rate between two surfaces is plotted against gas pressure, an initial portion 24 of plot 26, called the convection range, shows a decreasing energy loss with the reduction in gas pressure. The intermediate portion 28 of plot 26, called the conduction range, is almost flat. That is, in conduction range 28 the energy loss between the surfaces remains about constant as the gas pressure is reduced. The final portion 30 of plot 26, called the Piriani range, illustrates the reduction in energy loss with the further reduction in gas pressure caused by the reduction in the conduction component of heat transfer.

Radiation heat transfer can be reduced by the use of a low emissivity film 27 on the inner surface of pane 6. Film 27 could also be placed on the inner or outer surfaces of panes 4, 6 or suspended between the panes.

The present invention contemplates the provision of a low thermal conductivity gas within main insulating region 16 at a moderately low pressure, that is in a conduction range 28, so that the convective components of heat transfer have been substantially eliminated while the conductive components have not. The actual shape of curve 26 will depend upon the kind or composition of the gas (which includes vapors) used and the window pane spacing. For example, conduction range 28 may start at about 100–200 torr for a particular gas at a one-inch spacing but could be as high as 400 torr for a one-half inch spacing. By using a one-inch thick insulating region 16 and minimizing radiation heat transfer between panes of glass 4, 6 and conduction heat transfer along spacers 8 and edge seals 14, it is expected that window 2, using trichlorofluoromethane as the low thermal conductivity gas at a pressure of about 100 torr, would have an R-value of about 15. This would be a great improvement over even the best of commercially available windows.

The invention has generally been described in terms of a flat, dual glazed window having a one-inch spacing. Of course other spacings can be used, and, as shown in FIG. 5, curved glass panes can be used also.

An L-shaped evacuation tube 31, typically made of copper, is used to evacuate air from region 16 and fill it with a low thermal conductivity gas under moderate vacuum. One leg 32 passes through a sealed opening in edge spacer 18 while the other leg 33 lies near surface 20 and between panes 4,6. After the vacuum is achieved, leg 33 is mechanically sealed shut at its outer end. (The region surrounding tube 31 may be cleared of material 21 to permit later access to tube 31.)

In time, or due to a defective seal, interior 16 may rise in pressure sufficiently to make a substantial reduction in the thermal efficiency of window 2. If it is desired to reevacuate and re-fill region 16, the sealed end of leg 33 can be opened by simply snipping it off. Other, typically more elaborate, methods for re-evacuating and refilling region 16 can also be used.

Referring now to FIG. 3A, an alternative embodiment of window 2 is shown with like elements having like reference numerals. Window 34 includes an edge seal 36. Edge seal 36 includes inner and outer spacers 38 and 40 constructed similarly as are edge spacers 18. Edge seal 36 creates a buffer region 44 between edge spacers 38 and 40. Buffer region 44 is preferably filled with the same low conductivity gas as in main insulating region 16. However, other low conductivity gases, or air under vacuum, could also be used in buffer region 44, as described more fully below. Also, evacuation tubes 31 could be used for the initial and supplemental evacuation and filling of region 44 as well as region 16, though said evacuation tubes are not illustrated for the sake of clarity.

Similarly, FIG. 3B shows an alternative embodiment of window 2 with a dual buffer edge seal 36. Edge seal 36 includes inner, intermediate and outer spacers 38, 40, 42 constructed similarly to edge seal 18. Edge seal 36 creates an inner buffer region 44 between edge spacers 38 and 40 and an outer buffer region 46 between edge spacers 40, 42. Buffer regions 44, 46 are preferably filled with the same low conductivity gas as in main insulating region 16. However, other low conductivity gases, or air under vacuum, could also be used in buffer regions 44, 46, as described more fully below. Also, evacuation tubes 31 could be used for the initial and supplemental evacuation and filling of regions 44, 46 as well as region 16, though said evacuation tubes are not illustrated for the sake of clarity.

Regions 44 and 46 can be placed at the same low pressure as region 16. Doing so should dramatically decrease the rate at which ambient air enters main insulating region 16 thus helping to keep main insulating region free from air, with its higher thermal conductivity, and help to keep the pressure low. Alternatively, one or both of buffer regions 44, 46 can be placed at a pressure higher than the low pressure within region 16 to reduce the pressure differential between the ambient air and the particular buffer region. Increasing the pressure within a buffer region 44 or 46 would also help to dilute any air which may enter the buffer region so that less air would enter into main insulating region 16. For example, one may wish to place inner buffer region 44 at the same low pressure as main insulating region 16, so to eliminate the tendency of gas within either region to enter into the other, and place outer buffer region 46 at the same pressure as the ambient atmosphere. This would substantially eliminate the tendency for the ambient atmosphere and the gas in outer buffer region 46 to mix because of the similarity of pressures. The main pressure differential would be across intermediate sealing panel 40. However, migration of gas from region 46 to region 44 would be migration primarily of the low conductivity gas so to help keep inner buffer region 44 and thus main insulating region 16 free from higher conductivity air.

Buffer regions 44 and 46 can also contain air under vacuum as a means of reducing contamination of the main insulating region 16 with high thermal conductivity atmospheric gases. Edge seals 36 can also comprise a mixture of low conductivity gases and air under vacuum in their design. For instance, buffer region 44 could contain a low conductivity gas while region 46 could contain air under vacuum. Of course, multiple buffer seal designs containing three or more regions can be constructed in a similar manner to the seals depicted in FIGS. 3A and 3B; such seal designs could contain many possible combinations of low conductivity gases at various pressures, as well as air under vacuum.

Edge spacers 18 may have configurations other than the flat one shown in FIGS. 1, 3A and 3B. FIGS. 4A–4E illustrate various cross-sectional shapes for spacers 18a–18e. An advantage of spacers 18a, 18b and 18d is that they each provide extended surfaces 48a, 48b and 48d facing the interior surfaces of panes 4, 6 so to provide a longer migration path for air migration.

The effectiveness of the invention depends in large part upon the effectiveness of the edge seals. Although existing sealants are satisfactory, improvements in the area could provide substantial benefits. For example, and referring to FIG. 5 an edge seal 50 is shown to include a generally I-beam shaped spacer 52 having a central protrusion 54 extending between panes 4, 6. This arrangement creates an extended, U-shaped migration path 56 and also uses atmospheric pressure to force spacer 52 against the edges 10, 12 of panes 4,6. Both of these aspects help to increase the sealing effectiveness of seal 50. Edge seal 18d provides similar benefits as edge seal 50. Note that the sealant applied between spacers 18a–18e and 52 and panes 4, 6 has not been shown in FIGS. 4A–4E and FIG. 5 for sake of clarity.

The invention can be used with transparent silica aerogels which incorporate a low thermal conductivity gas at conduction range pressures. (Aerogels are a bonded network of tiny silica spheres which create a rigid material which is transparent and which traps gases in pores smaller than the mean free path of the gases. See *Solar Energy Materials* 7 (1983) North-Holland Publishing Company at pp 393–400.) Since the aerogels can contain up to 97% gas by volume, such a structure may be able to combine the advantages inherent with the present invention and the advantages inherent with aerogels.

The present invention can be used much as the conventional window it replaces. Insulating windows 2, 34 can be used in place of conventional dual pane windows. The insulating value will be determined at least partially by the distance between panes 4, 6 so that modification may need to be made if conventional window frames are to be used to accommodate the thicknesses of window 2 which, for increased insulation, would typically be thicker than conventional double pane windows.

Referring now to FIG. 6, an insulating panel 60 is shown to include first and second panels 61, 62 separated by spacers 63 and sealed along their edges 64, 65 by edge seals 66. Panels 61, 62 are preferably made of a metal such as sheet steel, but may alternatively be made of metal/plastic laminates, plastic or ceramic. Edge seals 66 and first and second panels 61, 62 define a main insulating region 67 therein. Edge seals 66 in the preferred embodiment are made from edge spacers 68 of a low gas permeability, low thermal conductivity material to help reduce conduction losses between first and second panels 61, 62 along the edge seals. Edge spacers 68 could alternatively be made of more common, higher conductivity materials such as stainless steel or glass. The regions between panels 61, 62 and external to spacer 68 are filled with a protective material 69, such as epoxy, silicone, or polysulfide. Adhesion between edge spacers 68 and panels 61, 62 is by layers of sealant 70. Sealant 70 is preferably a low vapor pressure, low gas permeability adhesive, such as Torr-Seal brand epoxy. Alternatively, sealant 70 may be a welded or brazed metal seal if panels 61, 62 are metal, resulting in even lower rates of gas permeation into main insulating region 67. Buffer regions as in FIGS. 3A and 3B can similarly be incorporated into the design of panel 60.

Radiation heat transfer is reduced by the use of low emissivity films 71 such as thin reflective metal foils of aluminum, thermally separated by poor conducting glass fiber paper 72 such as 475 Tempstran 110 manufactured by Manville Corp. of Denver, Colo. Only two such films 71 are shown for sake of clarity, although multiple films are advantageous. Alternatively, low emissivity films 71 and glass fiber separator 72 can be replaced by using polyester film which has been aluminized. Since radiative heat transfer is a function of the number of low emissivity film, but not of their spacing, films 71 may be placed anywhere within main insulating region 67. A particular advantage of placing films 71 within the main insulating region 67, as opposed to adjacent to panel 62 as shown, is that convection currents of the insulating gas or vapor are reduced.

Other modifications and variations can be made to the disclosed embodiments without departing from the subject of the invention as defined in the following claims. For example, desiccants to absorb water (to maintain thermal insulation properties) can be used in spaces 16, such as adjacent edge seals 14, or incorporated in the spacers.

What is claimed is:

1. A thermally insulating structure comprising:
   an enclosure including first and second spaced-apart panels;
   an edge seal sealably connecting the panels to define a sealed insulating region between the panels; and
   a first gas filling the insulation region at a first pressure of about 100–200 torr to about $10^{-3}$ to $10^{-4}$ torr, which is sufficiently low to substantially eliminate convective heat flow through the insulating region but not so low as to substantially reduce conductive heat flow through the insulating region, the thermal conductivity of the first gas at said first pressure being substantially less than that of air.

2. The insulating structure of claim 1 wherein the gas has a thermal conductivity at said low pressure of less than half of the thermal conductivity of air at like conditions.

3. The insulating structure of claim 1 wherein the panels are metal panels.

4. The insulating structure of claim 1 wherein the enclosure includes spacers between the first and second panels.

5. The insulating structure of claim 1 wherein the edge seal includes outer and inner sealing elements and a buffer region defined between the outer and inner sealing elements and the first and second panels.

6. The insulating structure of claim 5 wherein the buffer region contains a second gas at a second pressure to act as a barrier between an ambient atmosphere and the first gas in the insulating region.

7. The insulating structure of claim 6 wherein the first and second gases are the same.

8. The insulating structure of claim 6 wherein the second pressure is about the ambient pressure.

9. The insulating structure of claim 6 wherein the second pressure is about the first pressure.

10. The insulating structure of claim 5 wherein the edge seal includes an intermediate sealing element positioned within said buffer region to define outer and inner buffer regions containing third and fourth gases at third and fourth pressure respectively.

11. The insulating structure of claim 10 wherein the third and fourth pressures are different.

12. The insulating structure of claim 10 wherein the fourth pressure is about the first pressure and the third pressure is about the ambient pressure.

13. The insulating structure of claim 12 wherein the third and fourth gases are the first gas.

14. The insulating structure of claim 13 wherein the first gas is incorporated into an aerogel material within the insulating region.

15. The insulating structure of claim 1 wherein the first gas is incorporated into an aerogel material within the insulating region.

16. The insulating structure of claim 1 further comprising a low emissivity film positioned between the first and second panels.

17. A thermally insulating structure comprising:
a window enclosure including first and second panels defining an insulating region;
a gas filling the insulating region at a first pressure of about 100–200 torr to about $10^{-3}$ to $10^{-4}$ torr, which is sufficiently low to substantially eliminate convective heat flow through the insulating region but not so low as to substantially reduce conductive heat flow through the insulating region, the gas having a thermal conductivity at said first pressure less than one half of that of air;
an edge seal sealably connecting the first and second panels; and
the edge seal including a buffer region defined between outer and inner sealing elements and the first and second surfaces, the buffer region containing the gas at a second pressure to act as a barrier between the ambient atmosphere and the gas in the insulating region.

18. The window of claim 17 wherein the first and second pressures are about equal.

19. The window of claim 17 wherein the edge seal includes outer and inner buffer regions containing the gas at about the of an ambient atmosphere pressure and at about the first pressure respectively.

20. The window of claim 19 further comprising a mechanical sealable evacuation tube passing through the edge seal.

21. The window of claim 20 wherein the edge seal is configured to be forced against the first and second panes by the ambient pressure.

22. A method for making a thermally insulating structure comprising the following steps:
positioning first and second panels parallel to one another at a chosen separation to define an insulating region therebetween;
sealing the insulating region by placing an edge seal between the first and second panels;
selecting a first gas;
choosing a first pressure of about 100–200 torr to about $10^{-3}$ to $10^{-4}$ torr, which is sufficiently low to substantially eliminate convective heat flow through the insulating region but not so low as to substantially reduce conductive heat flow through the insulating region, the thermal conductivity of the first gas at the first pressure being substantially less than that of air; and
filling the insulating region with the first gas at the first pressure.

23. The method of claim 22 wherein the positioning step is carried out using metal panels.

24. The method of claim 22 wherein the edge seal placing step includes the step of positioning outer and inner spaced apart sealing elements between the first and second panels to define a buffer region therebetween.

25. The method of claim 24 wherein the buffer region creating step includes the step of filling the buffer region with a second gas at a second pressure.

26. The method of claim 24 wherein the positioning step includes the step of positioning an intermediate sealing element between the first and second panels and between and spaced apart from the outer and inner sealing elements to define outer and inner buffer regions therebetween.

27. The method of claim 26 further comprising the step of filling the outer and inner buffer regions with third and fourth gases at third and fourth pressures.

28. The method of claim 27 wherein the outer and inner buffer regions filling step is carried out using the first gas at ambient and first pressures respectively.

29. The method of claim 22 wherein the filling step is carried out using the first gas incorporated into a aerogel material to fill the insulating region.

30. The method of claim 22 further comprising the step of placing a low emissivity film between the of the first and second panels.

31. A thermally insulating structure comprising:
an enclosure including first and second spaced-apart panels and an edge seal sealably connecting the panels to define a sealed insulating region between the panels;
the edge seal including out and inner sealing elements and have a buffer region define between the outer and inner sealing elements and the first and second panels;
a first gas filling the insulating region at a first pressure, the thermal conductivity of the first gas at said first pressure being substantially less than that of air; and
the buffer region containing the first gas at a second pressure to act as a barrier between the ambient atmosphere and the first gas in the insulating region.

32. A thermally insulating structure comprising:
an enclosure including first and second spaced-apart panels and an edge seal sealably connecting the panels to define a sealed insulating region between the panels;
the edge seal including outer and inner sealing elements and having a buffer region defined between the outer and inner sealing elements and the first and second panels;
a first gas filling the insulating region at a first pressure, the thermal conductivity of the first gas at said first pressure being substantially less than that of air; and
the buffer region contaIning a second gas at the first pressure to act as a barrier between the ambient atmosphere and the first gas in the insulating region.

33. A thermally insulating structure comprising:
an enclosure including first and second spaced-apart panels and an edge seal sealably connecting the panels to define a sealed insulating region between the panels;
the edge seal including outer and inner sealing elements and having a buffer region defined between the outer and inner sealing elements and the first and second panels;
a first gas filling the insulation region at a first pressure, the thermal conductivity of the first gas at said first pressure being substantially less than that of air; and the edge seal including an intermediate sealing element positioned within said buffer region to define outer and inner buffer regions containing third and fourth gases at third and fourth pressures respectively.

34. A thermally insulating structure comprising:
a window enclosure including first and second panels defining an insulating region;
a gas filling the insulating region at a first pressure, the gas having a thermal conductivity at said first pressure less than one half of that of air;
an edge seal sealably connecting the first and second panels; and
the edge seal including inner and outer buffer regions defined between outer and inner sealing elements and the first and second surfaces, the inner and outer buffer regions containing the gas at about the pressure of an ambient atmosphere and at about the first pressure respectively to act a barrier between the ambient atmosphere and the gas in the insulating region.

35. A method for making a thermally insulating structure comprising the following steps:
positioning first and second panels parallel to one another at a chosen separation to define an insulating region therebetween;
sealing the insulating region, the sealing step including the step of placing an edge seal between the first and second panels;
the edge seal placing step including the step of positioning outer and inner spaced-apart sealing elements between the first and second panels to define a buffer region therebetween; and
filling the insulating region and the buffer region with a first gas at a first pressure, the thermal conductivity of the first gas at the first pressure being substantially less than that of air.

36. A method for making a thermally insulating panel comprising the following steps:
positioning first and second panels parallel to one another at a chosen separation to define an insulating region therebetween;
sealing the insulating region, the sealing step including the step of placing an edge seal between the first and second panels;
the edge seal placing step including the step of positioning outer and inner spaced-apart sealing elements between the first and second panels to define a buffer region therebetween;
the sealing element positioning step including the step of positioning an intermediate sealing element between the first and second panels and between and spaced-apart from the outer and inner sealing elements to define outer and inner buffer regions therebetween;
filling the insulating region with a first gas at a first pressure, the thermal conductivity of the first gas at the first pressure being substantially less than that of air; and
filling the outer and inner buffer regions with third and fourth gases at third and fourth pressures.

* * * * *